United States Patent [19]

Schoenwald et al.

[11] Patent Number: 5,666,448
[45] Date of Patent: Sep. 9, 1997

[54] VARIABLE SPLITTING OPTICAL COUPLER

[75] Inventors: Jeffrey S. Schoenwald, Thousand Oaks; Stephen W. Clausi; James L. Peck, Jr., both of Huntington Beach, all of Calif.

[73] Assignee: Rockwell International Corporation, Seal Beach, Calif.

[21] Appl. No.: 532,194

[22] Filed: Sep. 22, 1995

[51] Int. Cl.$^6$ ................................................ G02B 6/32
[52] U.S. Cl. ............................ 385/44; 385/19; 385/34; 385/36; 359/636
[58] Field of Search ............................ 385/44, 31–36, 385/15–19; 359/636

[56] References Cited

U.S. PATENT DOCUMENTS

| | | | |
|---|---|---|---|
| 3,870,396 | 3/1975 | Racki et al. | 350/96 |
| 3,883,217 | 5/1975 | Love et al. | 350/96 |
| 3,901,582 | 8/1975 | Milton | 385/44 |
| 4,130,345 | 12/1978 | Doellner | 350/96.22 |
| 4,173,390 | 11/1979 | Kach | 350/96.16 |
| 4,176,908 | 12/1979 | Wagner | 350/96.15 |
| 4,262,995 | 4/1981 | Tangonan | 350/96.16 |
| 4,525,025 | 6/1985 | Hohmann et al. | 350/96.15 |
| 5,037,172 | 8/1991 | Hekman et al. | 385/31 |
| 5,071,213 | 12/1991 | Chan | 385/52 |
| 5,282,257 | 1/1994 | Ota | 385/46 |
| 5,285,305 | 2/1994 | Cohen et al. | 359/110 |
| 5,286,129 | 2/1994 | French et al. | 403/127 |
| 5,436,986 | 7/1995 | Tsai | 385/18 X |

*Primary Examiner*—Phan T. H. Palmer
*Attorney, Agent, or Firm*—Harry B. Field; Lawrence N. Ginsberg

[57] ABSTRACT

A variable splitting optical coupler includes a first port assembly, a second port assembly, a movable deflecting element assembly and a third port assembly. The first port assembly includes a first lensing element and receives a first optical signal. The second port assembly includes a second lensing element and emits a variable transmitted portion of the first optical signal. The movable deflecting element assembly includes a movable deflecting element positioned between the first and second port assemblies. The third port assembly includes a third leasing element. The movable deflecting element is so positionable and the third port assembly is so positioned and arranged so that a deflected portion of the first optical signal is deflected from the deflecting element and directed through the third port assembly. The variable transmitted portion of the first optical signal is directed through the second port assembly without being deflected by the deflecting element. The transmitted and deflected portions of the first optical signal are expanded and collimated, while passing through the optical coupler by appropriate positioning of the lensing elements to provide efficient and accurate control of the first optical signal. The movable deflecting element varies the relative splitting of the deflective and transmitted portions of the first optical signal.

16 Claims, 6 Drawing Sheets

VARIABLE SPLITTING OPTICAL COUPLER

BACKGROUND OF THE INVENTION

1. Field of the Invention

This invention relates to optical coupling technology and more particularly to the use of a movable deflecting element to vary the relative splitting of an optical signal.

2. Description of the Related Art

Embodiments of what are conventionally referred to as optical T-couplers have been previously described in which light guiding glass cores are employed to facilitate coupling between and among several optical fiber channels. For example, U.S. Pat. No. 3,883,217, issued to Love et al., discloses a system employing a glass core light guide to interface opposing bundles of fibers. The light guide length is chosen to insure that light from any one incoming fiber is distributed across the entire aperture of the guide so that the entire receiving bundle is illuminated and data transmitted on all outgoing fibers. This also facilitates the multiplexing of several optical signals onto all outgoing fiber channels simultaneously, which may or may not be desirable, depending on the application. Problems arise in the complexity, component count and manufacturability of the device.

In U.S. Pat. No. 3,870,396, issued to Racki et al., right angle isosceles glass prisms are interposed between terminated bundles of fibers to provide for partial reflection and transmission. Transition light guides, which reduce the cross-sectional area of the device to match the geometry of the fiber bundle are subject to radiative loss.

In U.S. Pat. No. 4,176,908, issued to R. E. Wagner, the concept of a v-shaped groove or notch formed in the light guide is introduced to provide for internal reflection of the beam at substantially 90 degrees to the direction of primary light propagation for the purpose of directing light to a branch port of similar light guiding medium so as to direct a fraction of the total optical power toward the branch, roughly in proportion to the fraction of light guide cross-sectional area occluded by the V-shaped groove.

In the aforementioned disclosures the optical light guides are apparently intended to interface with either bundles of fibers, or appropriate light sources or detectors, such as laser diodes, light emitting diodes or optical photodetectors. The above disclosures are primarily concerned with multi channel distribution of light signals to or between bundles of fibers. This approach has inherent drawbacks due to low power efficiency of distribution into any single fiber channel.

U.S. Pat. No. 4,130,345, issued to O. L. Doellner, discloses the use of single optical fibers in the construction of wedge-shaped building blocks that must be formed, polished, coated with dielectric layers (to facilitate controlled through-transmission and reflection at 90 degrees to the incident direction), and must be aligned and bonded with precision corresponding to the alignment requirements of single or multimode fibers. The use of relatively large diameter glass rods for beam mixing, with respect to the '396 and '908 disclosures mentioned above, is deficient because the reflections from surfaces large in comparison to the wavelength can give rise to time delayed "ghost" signals due to multiple reflections at the light guide end surfaces, but dielectric anti-reflection coatings can significantly reduce this problem, and is, in fact, a common practice. Problems arise concerning the cost of reliably manufacturing such complex coupling devices as described in U.S. Pat. No. 4,130,345. At the time of that invention, multimode fiber was most commonly in use, and the invention would be more tolerant of alignment errors for such fibers than for singlemode fibers. Furthermore, the inventor bases advantages of his invention on incorrectly comparing the outer diameter of typical multimode fibers—125 micrometers (0.005 inches), which is the same for singlemode fibers—to the core diameter of singlemode fibers, typically 10 micrometers or less. The inventor makes no distinction between the fiber diameter and the core diameter. In fact, most standard multimode fibers have core diameters of 50–100 micrometers (0.002–0.004 inches), and are sheathed with an outer glass cladding that is usually approximately the same for both types of fibers to facilitate standard connectorization.

These types of couplers are all variants of a bulk wave beam splitter. Another form of coupler is the fused fiber coupler. In this device, two or more fibers are twisted together and heated while axial tension is applied. As the glass of the fibers softens, the optical cores are brought into close enough proximity that light can transfer from one fiber to the other(s). Such devices are reliable, however, they are usually relatively expensive to manufacture, and function within specifications over a limited range of optical wavelength, because the rate of power transfer depends on the ratio of optical wavelength to physical separation distance between cores of adjacent fibers.

There are no optical lensing elements disclosed in the aforementioned prior art. Clearly it is an advantage to reduce the component complexity in light of prevailing technology. However, the advent of diffractive optics, microlens and gradient index lens technology provides the basis for the development of optical T-couplers, as will be disclosed below, that can easily and efficiently interface single fibers, whether singlemode or multimode, permitting more flexibility in designing optical fiber networks.

All the aforementioned inventions relate to fixed passive couplers, primarily for information distribution. As will be disclosed below, the present invention includes a movable element to permit the variable coupling into respective output ports, such as may be useful for position sensing.

OBJECTS AND SUMMARY OF THE INVENTION

Accordingly, it is principal object of this invention to optical coupling apparatus of improved efficiency, of minimum complexity and simple construction.

It is another object of the invention to provide an optical T-coupler of simple design, easily manufactured and easily applied which permits efficient, variable optical coupling between individual optical fibers, optical sources and optical detectors, such as are used in optical fiber networks.

These and other objects are achieved by introducing light into one port of the coupler, whether from an optical fiber or an optical source, such as a light emitting diode (LED) or laser diode (LD), and by emitting light from other ports of the coupler, into either optical fibers or photodetectors. The coupler ports include appropriate tensing elements, such as microlenses or gradient index lenses to properly match the étendue of the light source, detector or fiber to that of the light guide of the coupler. A principal function of the tensing system is to insure that the light beam within the coupler portion of the device is substantially a plane-wave collimated beam expanded to the extent that it fills the cross-section of the light guide. The main body of the coupler, apart from the lensing elements, comprises, in at least one or more embodiments, a cavity for free space transmission of a plane-collimate beam of light in which may be interposed a deflecting element, such as a mirror or prism coated to provide high reflectance and deflect a portion of the optical beam. It is convenient to assume for the sake of discussion that the deflecting element has a reflecting surface that diverts a portion of the beam at 90 degrees to the initial direction. Having the beam within the light guide be collimated results in a great simplification of the design of components and analysis of optical propagation. The deflecting element can be formed in various configurations, so as to make the device behave in a directional (non-reciprocal) or bi-directional (reciprocal) manner with regard to the transmission of light. The deflecting element may be so arranged as to permit a variable position, thus permitting a variable ratio of the transmitted undeflected and deflected portions of the incident beam.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
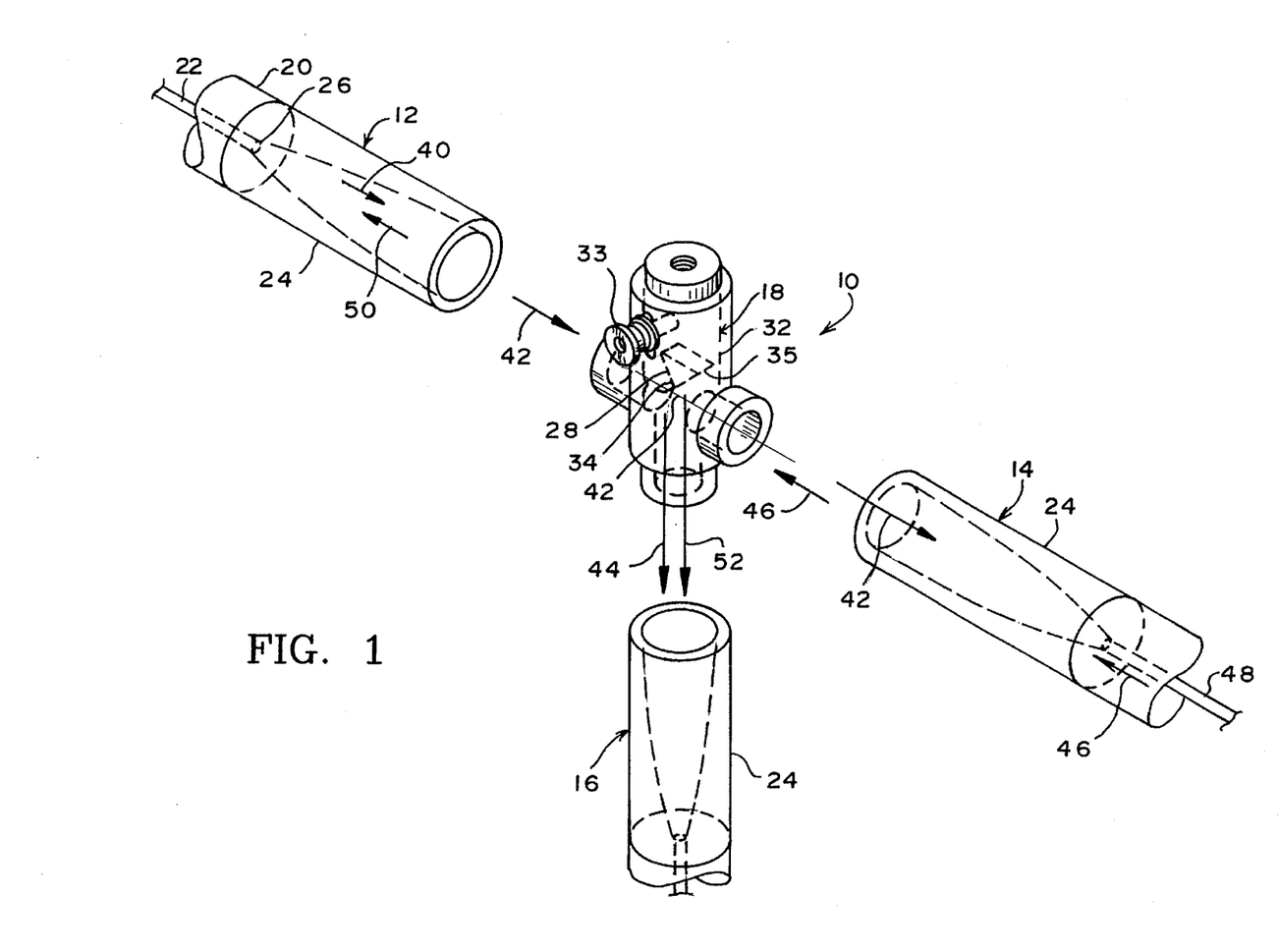
FIG. 1 is an exploded perspective view of a preferred embodiment of the present invention in which bi-directional coupling and splitting of optical signals is achieved.

Referring now to the drawings and the characters of reference marked thereon, FIG. 1 illustrate a preferred embodiment of the present invention in which bi-directional coupling and splitting of the optical signals is achieved, this embodiment being designated generally as 10. Optical coupler 10 includes a first port assembly 12, a second port assembly 14, a third port assembly 16 and a deflecting element assembly 18. The first port assembly 12 includes a ferrule 20 for aligning a fiber optic cable 22 concentrically. The ferrule 20 positions the fiber optic cable 22 with respect to a lens 24. The fiber optic cable 22 provides connection to an optical data bus (not shown). Lensing element 24 may comprise, for example a gradient index (GRIN) lens or a single or multi-lens assembly. The tensing element 24 expands and collimates light emerging from the fiber optic cable 22. Reciprocally, a collimated optical beam will be compressed and focused into the aperture 26 of the fiber optic cable 22. In the instance where a GRIN lens is used, the components of the port assembly 12 may be bonded with appropriate, conventional optical adhesives. Alternatively, where the lensing element 24 comprises one or more classical lenses, the assembly 12 may be physically assembled within a mechanical housing to position and align the elements as desired. The above discussion regarding port assembly 12 applies equally to the second port assembly 14 and third port assembly 16.

The movable deflecting element assembly 18 includes a deflecting element 28, supported by a movable retention member 32. The movable retention member 32 may be made immobile, if desired, by locking screw assembly 33. Other types of retention members permitting sliding or rotating motion are within the purview of this invention. Preferably, the movable retention member is mechanically coupled to another device (not shown) intended to control a mechanical function, such as a valve or switch. The deflecting element 28 includes angled, deflecting surfaces 34, 35, to cause reflection and redirection of an incident light beam. The deflecting element 28 may be formed of glass or other suitable material for providing optically smooth surfaces.

The retention member 32 may be formed of suitable material for retaining the deflecting element 28, such as a metal. In operation, for example, the first port assembly 12 receives a first optical signal 40 from the fiber optic cable 22. The optical signal 40 is expanded and collimated as it passes through the lensing element 24. The second port assembly 14 emits a predetermined, transmitted portion 42 of the first optical signal 40. The deflecting element 28 and third port assembly 16 are positioned such that a deflected portion 44 of the first optical signal 40 is deflected from the deflecting element assembly 18 and directed through the third port assembly 16. The transmitted portion 42 and deflected portion 44 of the first optical signal 40 are expanded and collimated while passing through the optical coupler 10 by appropriate positioning of the lensing elements 24 to provide efficient and accurate control of the first optical signal 40.

This embodiment 10 is bi-directional, that is, a second optical signal 46 may be transmitted through the opposing fiber optic cable 48 and be expanded and collimated by the tensing element 24 within the second port assembly 14. A first transmitted portion 50 of the second optical signal 46 is directed through the first port assembly 12 and the second deflected portion 52 of the second optical signal 46 is directed through the third port assembly 16.

Thus, it can be seen that by using expanded and collimated optical beams, the transmission and splitting of optical signals can be accomplished with high efficiency. Unlike prior art devices such as disclosed in U.S. Pat. No. 3,883, 217, which utilize bundles of fibers and a volumetric mixing region, the present invention does not suffer from the inefficiency associated with the loss of signal due to the ratio of optical apertures of the bundled fibers to the total cross-sectional area of the bundled fibers, which consist of core and cladding regions.

Furthermore, unlike U.S. Pat. No. 4,173,390, which contains no use of tensing elements, the use of lensing elements for collimating and focusing described in the present invention improves the efficiency of optical transmission and coupling.

Figure 2:
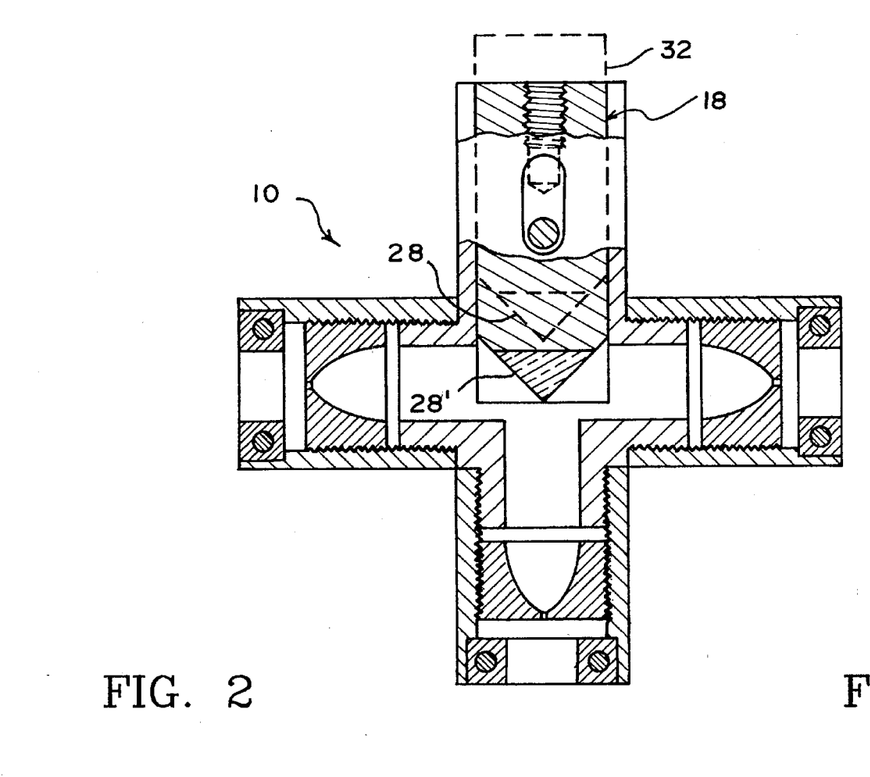
FIG. 2 is a front cross-sectional view of the movable deflecting element assembly of the FIG. 1 apparatus.
Figure 3:
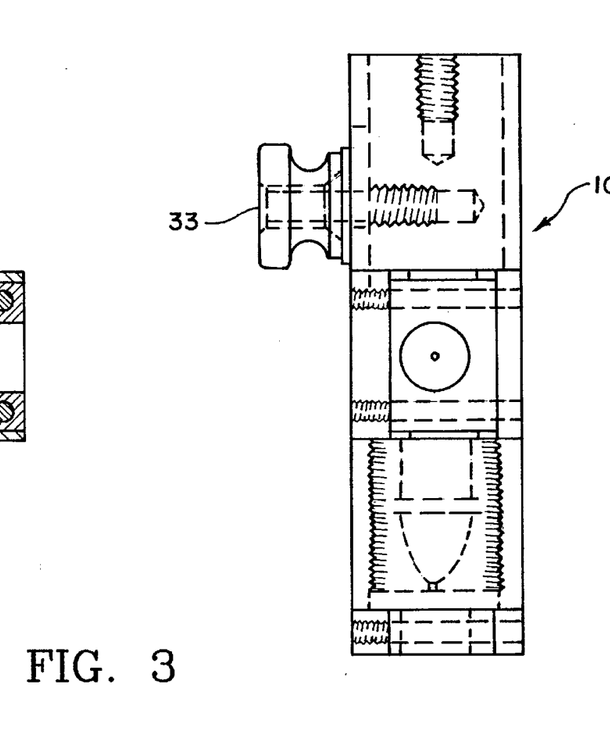
FIG. 3 is a side elevational view of the movable deflecting element assembly of FIG. 2.

Referring now to FIG. 2, an enhanced view of a movable deflecting element assembly 18 is illustrated showing a deflecting element 28 in a first extreme position and in a second extreme position 28'. In the first position no deflection of optical beam 40 occurs, allowing transmission entirely to second port assembly 14. In the second position 28', optical beam 40 is entirely deflected to the third port assembly 16, as optical signal 44 with no portion being transmitted to optical port assembly 14. FIG. 3 illustrates the locking screw assembly 33 in perspective.

Figure 4:
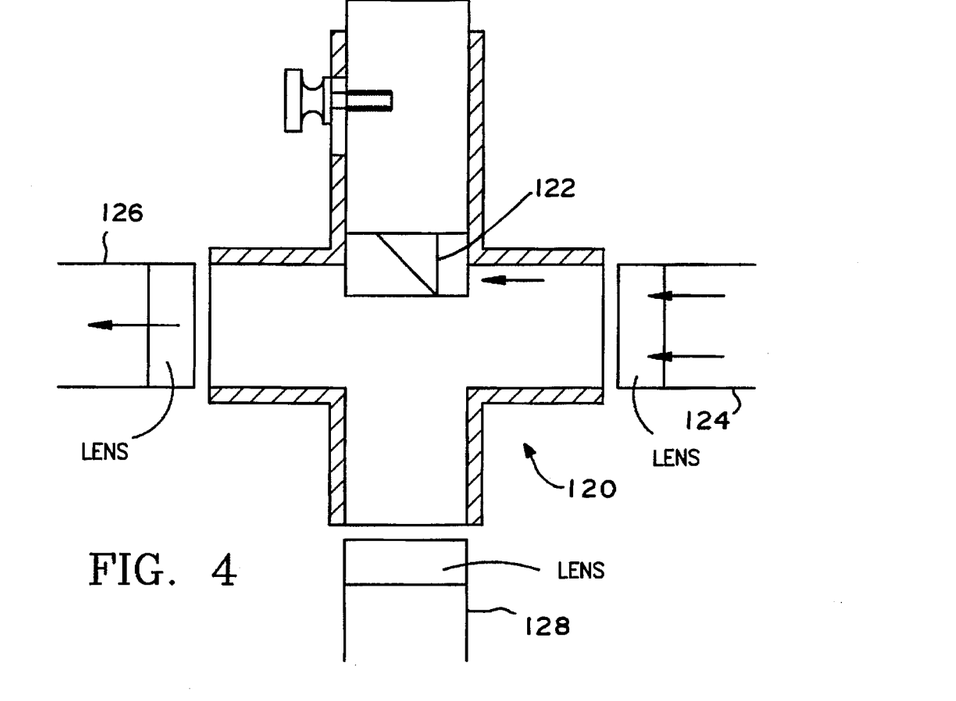
FIG. 4 is a functional, schematic diagram of an embodiment of the optical coupler utilizing a deflecting element providing uni-directional coupling between two inline ports.
Figure 5:
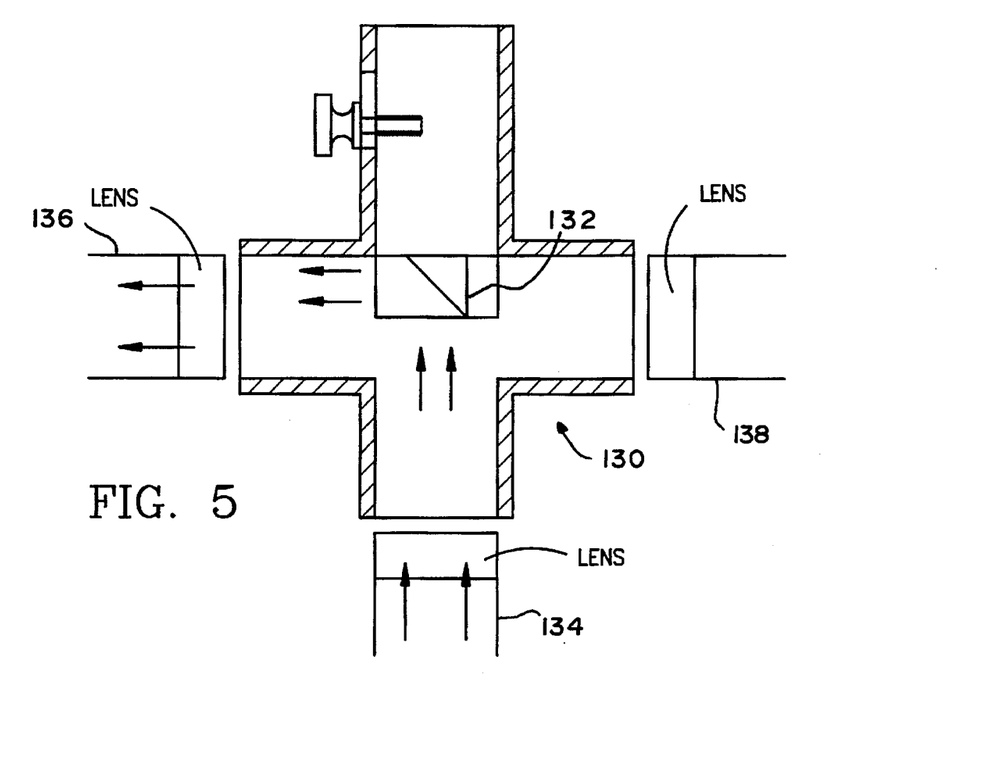
FIG. 5 is a functional, schematic diagram of an embodiment to the optical coupler utilizing a deflecting element providing uni-directional coupling between a perpendicular port and an inline port.
Figure 6:
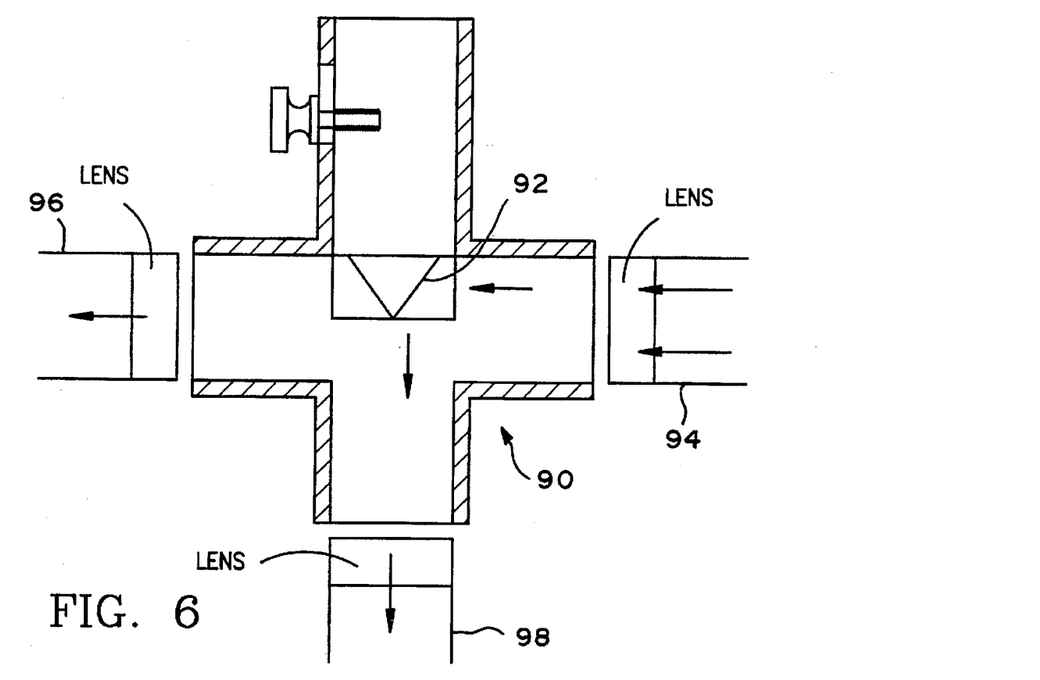
FIG. 6 is a functional, schematic diagram of an embodiment to the optical coupler utilizing a deflecting element providing bi-directional coupling between either an inline port or a perpendicular port.
Figure 7:
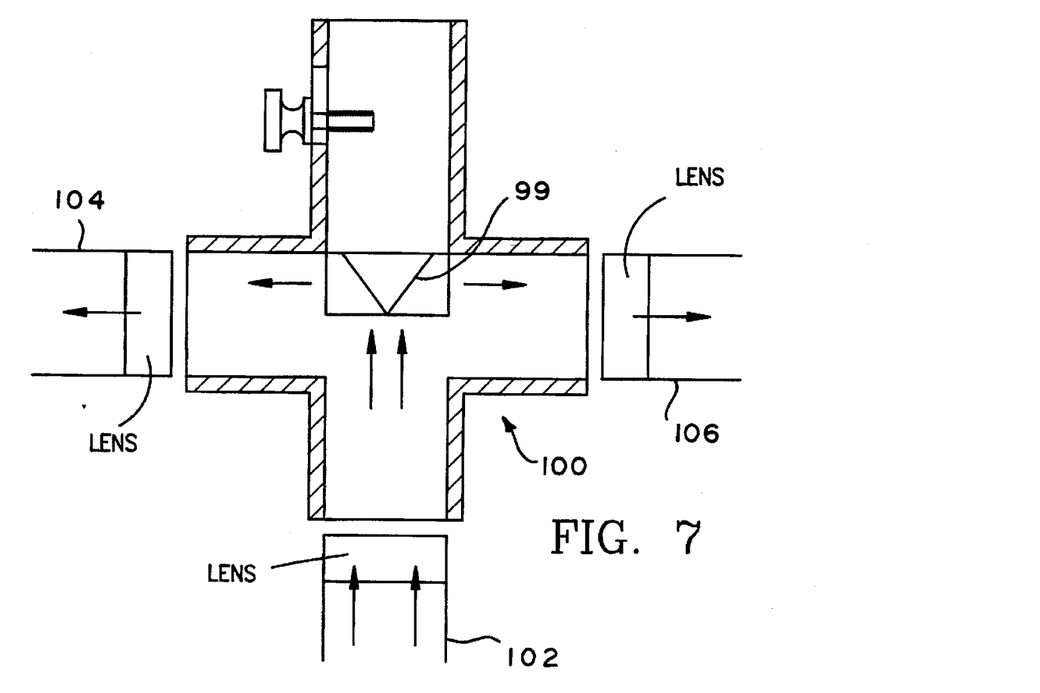
FIG. 7 is a functional, schematic diagram of an embodiment to the optical coupler utilizing a deflecting element providing hi-directional coupling between a perpendicular port and two inline ports.
Figure 8:
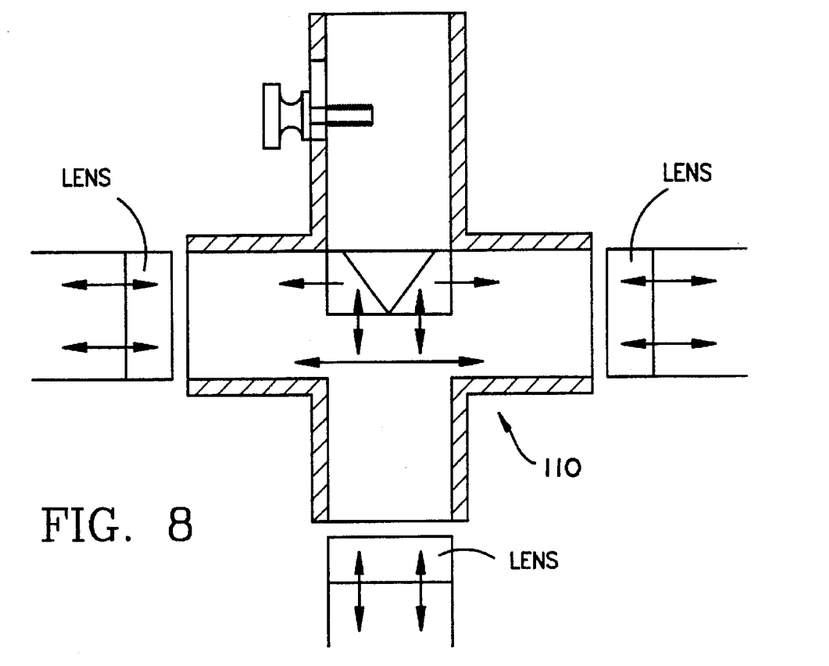
FIG. 8 is a functional, schematic diagram of an embodiment of the optical coupler utilizing a deflecting element providing bi-directional coupling between all ports.

Referring now to FIGS. 4–8, it can be seen that by changing the details of the deflecting element geometry, the principles of the present invention can be used to obtain various degrees of coupling and directionality. FIGS. 6–8 describe all of the possible combination of optical beam propagation through the optical coupler given that the deflecting element is designed for bi-directional operation. FIGS. 4–5 describe unidirectional operation for the indicated design of the deflecting element.

FIG. 1 represented an optical coupler, which utilizes a movable bi-directional deflecting element. Similarly, FIG. 6 illustrates an optical coupler, designated generally as 90, also using a bi-directional movable deflecting element 92. In this example, light is received at optical port 94 and is coupled to both ports 96, 98, by means of the bi-directional element 92. Comparison of FIGS. 1 and 6 illustrates the bi-directional properties of the present invention.

FIG. 7 further illustrates the bi-directionality of the present invention using a bi-directional deflecting element 99, this embodiment being designated generally as 100. Light entering at optical port 102 is deflected by deflecting element 99 to ports 104, 106.

FIG. 8, illustrates an optical coupler designated 110, in which light entering any port is coupled to each of the other ports regardless of the direction of transmission.

Referring now to FIG. 4, an optical coupler designated generally as 120, includes a deflecting element 122 possessing uni-directional optical properties as discussed below. Light entering at the second port 124 is transmitted only to the first optical port 126. There is a certain degree of optical attenuation because of the construction of the deflecting element. However, no light will be deflected to the third optical port 128.

Referring now to FIG. 5, another optical coupler is shown, designated generally as 130. The optical deflecting element 132 is uni-directional, as in the previous embodiment, discussed above with respect to FIG. 4. Light received at the third port 134 is deflected and coupled to the first port 136. However, no light is received at the second port 138.

It is understood that any optical fiber in the previous embodiment may be replaced directly by an optical source or detector. This may limit the bi-directional properties of the coupler as implemented with optical fibers.

It is understood that optical signals may be received from fiber optic cables or directly from optical sources. Furthermore, it is understood that optical signals may be transmitted from the coupler into fiber optic cables or directly to optical detectors. However, the direct application of optical sources and detectors at any port or the coupler may result in the loss of bi-directionality. The deflecting surfaces of the deflecting elements are generally at approximately 45° relative to the direction of the respective optical signal. Efficiency may be enhanced of the application of appropriate optical coatings to improve optical reflectivity from the deflecting surfaces.

Figure 9:
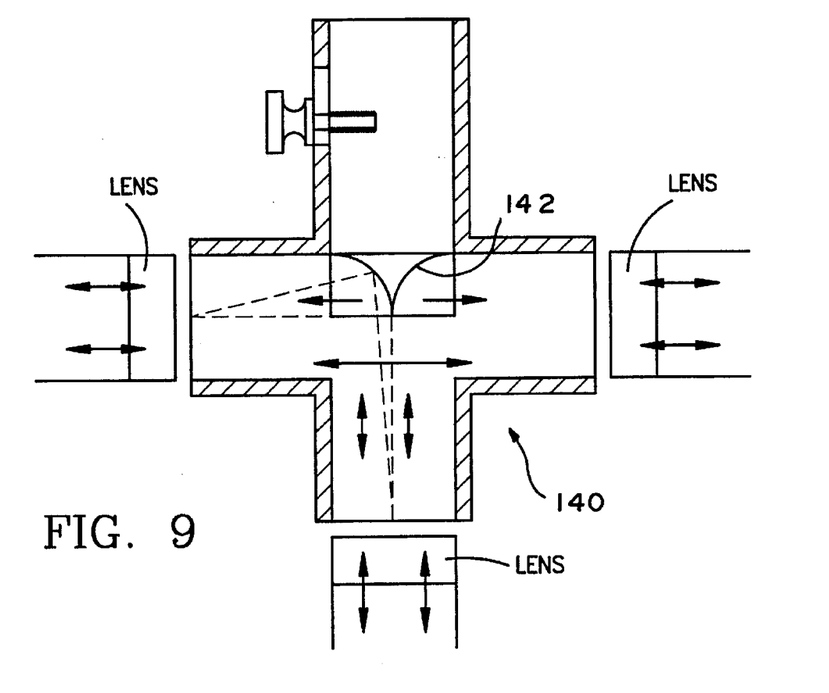
FIG. 9 is a functional, schematic diagram illustrating the use of a deflecting element with a curved surface.

The deflecting surfaces in all previous embodiments have been shown to be flat. However, as shown in the embodiment 140 of FIG. 9, the deflecting element 142 may include curved deflecting surfaces to further enhance control or focus of the deflected portion of the beam.

Figure 10:
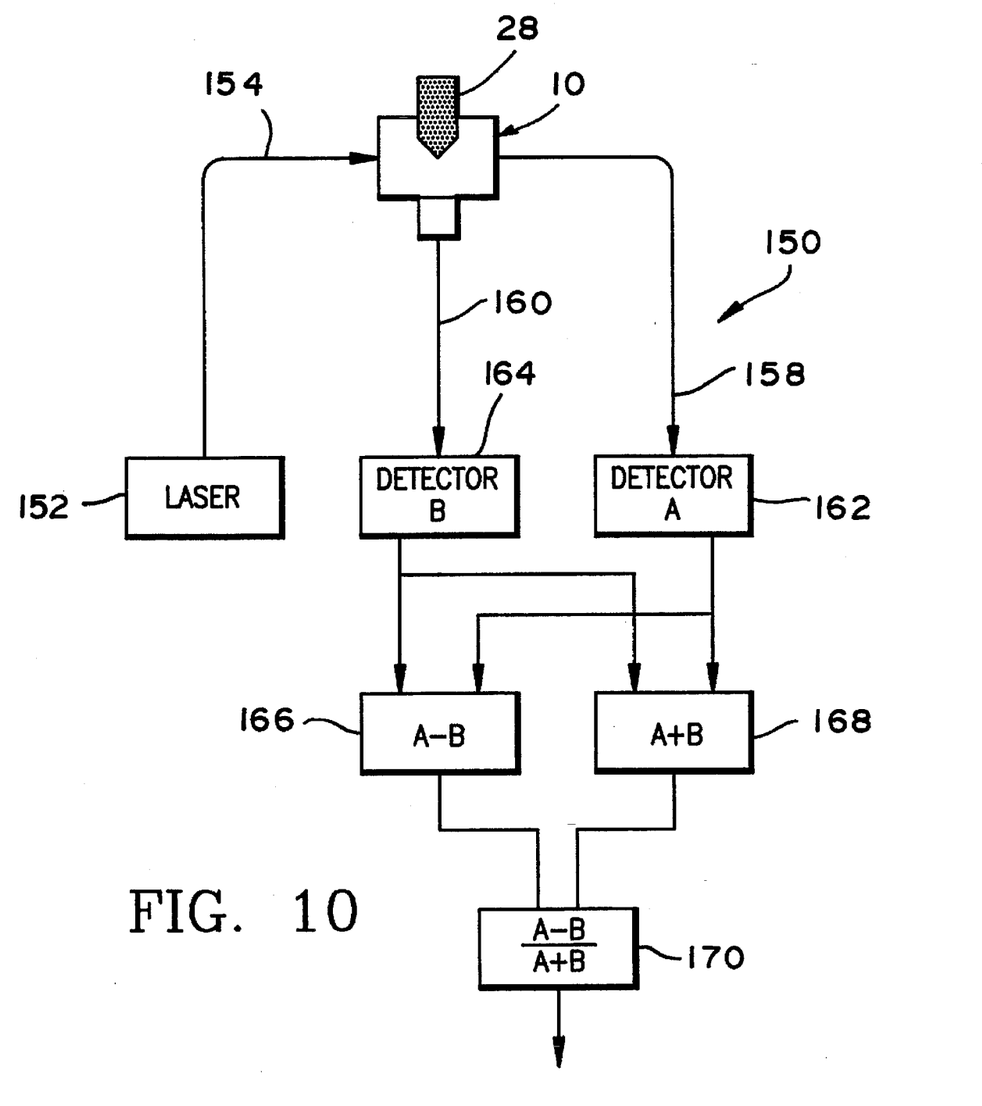
FIG. 10 is a schematic illustration of the processing of the various optical signals to determine the position of the variable deflecting element.

Referring now to FIG. 10, a system for processing various optical signals produced by the output ports of the T-coupler due to the influence of the variable position deflecting element 28 is illustrated, the system generally being designated as 150.

A laser 152, or other equivalent source, provides light either directly or via an optical fiber 154 to a port of the T-coupler 10, containing the variable position deflecting element 28.

The optical signals transmitted from each of the output ports either directly or via optical fibers, 158 and 160, are received at detectors A and B, 162 and 164, respectively. The output signals of these detectors, which are typically electrical, are each directed simultaneously to two modules 166 and 168, typically analog electronic in nature, that perform arithmetic functions. Module A–B, i.e. 166, computes the arithmetic difference of the amplitudes of the outputs of detectors A and B, producing a signal, designated as A–B. Module A+B, 166, computes the arithmetic sum of the amplitudes of the outputs of detectors A and B, producing a signal, designated as A+B. The outputs of the two respective modules 166 and 168 are signals that serve as inputs to a third module 170, whose function is to compute the ratio of the signals (A–B)/(A+B).

The output of module 170 can vary between two extreme values, depending on the extreme positions of the variable position deflecting element 28. In one extreme case, the amplitude of the signal on fiber 158 is maximum with a finite value designated simply as A. Concurrently, there is no output 160 from the other output port and its signal value is designated as B=0. Examining the ratio of the signals we see that $(A-B)/(A+B)=A/A=+1.$ Similarly, if the variable position deflecting element 28 is in its other extreme position, thus deflecting all light to detector B, with the detector A receiving no light, then we may designate A=0, and the signal produced by detector B as B. Thus, for this other extreme case of the variable position deflecting element $(A-B)/(A+B)=(-B)/(+B)=-1$ This illustrates the logic signals that are derived when the T-coupler 10 is used as a position switch.

If the T-coupler 10 is to be used as a continuously variable position sensor, the output of module 170 will vary continuously from +1 to −1.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A variable splitting optical coupler, comprising:
   a) a first port assembly for receiving a first optical signal, said first port assembly comprising a first lensing element;

b) a second port assembly for emitting a variable transmitted portion of said first optical signal, said second port assembly comprising a second lensing element;

c) a movable deflecting element assembly comprising a movable deflecting element positioned between said first and second port assemblies; and, d) a third port assembly comprising a third lensing element, said movable deflecting element being so positionable and said third port assembly being so positioned and arranged such that a deflected portion of said first optical signal is deflected from said deflecting element and directed through said third port assembly and said variable transmitted portion of said first optical signal is directed through said second port assembly without being deflected by said deflecting element, said transmitted and deflected portions of said first optical signal being expanded and collimated while passing through said optical coupler by appropriate positioning of said lensing elements to provide efficient and accurate control of said first optical signal, wherein said movable deflecting element varies the relative splitting of said deflected and transmitted portions of said first optical signal.

2. The optical coupler of claim 1, wherein said movable deflecting element assembly further comprises:

a) a first detecting element for detecting the intensity of said transmitted portion of said first optical signal;

b) a second detecting element for detecting the intensity of said deflected portion of said first optical signal;

c) a first logic circuit for determining the difference in said intensities detected by said first and second detecting elements;

d) a second logic circuit for determining the sum of said intensities detected by said first and second detecting elements; and e) a third logic circuit for determining the ratio of said difference to said sum of said first and second logic circuits, said ratio being an indication of the location of said movable deflecting element.

3. The optical coupler of claim 1, wherein said second port receives a second optical signal, said second optical signal being directed through said first port assembly, no portion of said second optical signal being directed through said third port assembly.

4. The optical coupler of claim 1, wherein said third port assembly receives a third optical signal, said movable deflecting element being arranged and constructed to deflect a first variable deflected portion of said third optical signal, said first variable deflected portion of said third optical signal being directed through said first port assembly, no portion of said third optical signal being directed through said second port assembly.

5. The optical coupler of claim 1, wherein said second port receives a second optical signal, a first variable transmitted portion of said second optical signal being directed through said first port assembly and a second deflected portion of said second optical signal being directed through said third port assembly.

6. The optical coupler of claim 1, wherein said third port receives a third optical signal, a first variable deflected portion of said third optical signal being directed through said first port assembly and a second variable deflected portion of said third optical signal being directed through said second port assembly.

7. The optical coupler of claim 1, wherein said first optical signal is received from an optical source.

8. The optical coupler of claim 1, wherein said first optical signal is received from an optical fiber.

9. The optical coupler of claim 1, wherein said variable transmitted portion of said first optical signal is emitted to an optical detector.

10. The optical coupler of claim 1, wherein said variable transmitted portion of said first optical signal is emitted to an optical fiber.

11. The optical coupler of claim 1, wherein said variable deflected portion of said first optical signal is directed to an optical detector.

12. The optical coupler of claim 1, wherein said variable deflected portion of said first optical signal is directed to an optical fiber.

13. A variable splitting bi-directional fiber optic coupler, comprising:

a) first, second and third port assemblies, each port assembly being capable of receiving a respective optical signal each port comprising a respective lensing element; and, b) a movable deflecting element assembly comprising a movable deflecting element being so positionable to redirect desired portions of each said respective optical signal to said remaining port assemblies; said desired portions being expanded and collimated while passing through said optic coupler by appropriate positioning of said lensing elements to provide efficient and accurate control of said redirected desired portions of each said respective optical signal, wherein said movable deflecting element varies the relative splitting of said redirected desired portions of said respective optical signals.

14. The bi-directional fiber optic coupler of claim 13, wherein said variable deflecting element has deflecting surfaces formed thereon at approximately 45° relative to the direction of said respective optical signal, thus redirecting said optical signal to a desired port assembly.

15. The bi-directional fiber optic coupler of claim 13, wherein said variable deflecting element has reflecting surfaces thereon of a desired orientation and curvature to produce an effective control of said redirected desired portions of each said respective optical signal with optimized efficiency.

16. The bi-directional fiber optic coupler of claim 15, wherein said reflecting surfaces are flat.

* * * * *

UNITED STATES PATENT AND TRADEMARK OFFICE
CERTIFICATE OF CORRECTION

PATENT NO. : 5,666,448
DATED : September 9, 1997
INVENTOR(S) : Schoenwald et al

It is certified that error appears in the above-identified patent and that said Letters Patent is hereby corrected as shown below:

<u>IN THE ABSTRACT</u> line 10, change "leasing" to --lensing--.

<u>COLUMN</u>
    2, line 44, after "to" add --provide a variable splitting--
    2, line 57, change "tensing" to --lensing--
    2, line 60, change "tensing" to --lensing--

4, line 6, change "tensing" to --lensing--
    4, line 51, change "tensing" to --lensing--
    4, line 67, change "tensing" to --lensing--

6, line 28, change "166" to --168--

Signed and Sealed this

Twenty-fifth Day of November, 1997

Attest:

BRUCE LEHMAN

*Attesting Officer*    *Commissioner of Patents and Trademarks*